United States Patent [19]

Sakaguchi et al.

[11] 4,167,860

[45] Sep. 18, 1979

[54] UNIVERSAL JOINT

[75] Inventors: Kiyoshi Sakaguchi; Katsuji Ohtsubo, both of Aichi; Toshimitsu Sakai; Toshikatsu Taniguchi, both of Okazaki; Hitoshi Mizutani, Aichi, all of Japan

[73] Assignee: Toyota Jidosha Kogyo Kabushiki Kaisha, Toyota, Japan

[21] Appl. No.: 861,538

[22] Filed: Dec. 19, 1977

[30] Foreign Application Priority Data

Dec. 20, 1976 [JP] Japan ................................ 51-153117

[51] Int. Cl.² ............................................. F16D 3/30
[52] U.S. Cl. ....................................................... 64/21
[58] Field of Search ................... 403/34, 39, 40, 133, 403/135; 64/21

[56] References Cited

U.S. PATENT DOCUMENTS

| | | | |
|---|---|---|---|
| 2,733,085 | 1/1956 | Latzen | 403/135 |
| 2,926,975 | 3/1960 | Karde | 403/39 |
| 3,041,094 | 6/1962 | Herbenar | 403/39 |
| 3,305,617 | 2/1967 | Dumpes | 403/135 |
| 3,342,513 | 9/1967 | Melton | 403/135 |
| 3,818,721 | 6/1974 | Wahlmark | 64/21 |
| 3,877,251 | 4/1975 | Wahlmark | 64/21 |

Primary Examiner—Charles J. Myhre
Assistant Examiner—R. C. Turner
Attorney, Agent, or Firm—Koda and Androlia

[57] ABSTRACT

A universal joint of the type including: a first shaft to which tripod shafts are secured radially from the axis thereof; three rollers formed at the outer peripheries thereof with spherical surfaces and with which the tripod shafts are crowned; and a second shaft provided therein with raceways identical in number with the rollers and on which the outer peripheries of the rollers roll and are supported. The universal joint further includes a plurality of oil grooves provided at contact-roll surfaces between the rollers and the cylindrical raceways.

9 Claims, 7 Drawing Figures

UNIVERSAL JOINT

BACKGROUND OF THE INVENTION

1. Field of Invention

This invention relates to universal joints, and more particularly, to universal joints having a plurality of rollers moveable in the circumferential and axial directions.

2. Prior Art

Shown in FIG. 1 is a universal joint of the prior art. In this universal joint secured to one end of a first shaft 1 is an outer race 2 in which tripod shafts 3 disposed radially from the axis of the shaft 1 are fixed. The tripod shafts 3 are crowned with cylindrical inner surfaces 6 of rollers 5 each formed at the outer periphery thereof with a spherical surface 4.

A second shaft 7 is enlarged at one end thereof to form a large diameter portion where three cylindrical raceways 8 are formed in parallel with the axis of the shaft 7. Torque is transmitted between the first shaft 1 and the second shaft 7 by crowning the rollers 5 with the cylindrical inner peripheral surfaces 8.

When torque is transmitted on condition that the first shaft 1 and the second shaft 7 are inclined with respect to each other, rollers 5 roll about the axis of the respective tripod shafts 3 and move axially of the tripod shafts 3. The rollers 5 also move longitudinally of the cylindrical receways 8 of the second shaft 7 to transmit torque between the two shafts and therefore function as a constant velocity universal joint wherein the instantaneous centers of rotation of the shafts 1 and 7 are gradually changed so that the angular velocities of rotation of both shafts are identical with each other.

Shown in FIG. 2 is another universal joint of the prior art. In this embodiment the tripod shafts 3 are secured to the second shaft 7 and rollers 5 are supported in the cylindrical raceways 8 formed in the first shaft 1. The roller 5 functions similar to those in the embodiment shown in FIG. 1.

When a universal joint of this type is utilized on condition that the first shaft 1 and the second shaft 7 are inclined with respect to each other, the instantaneous center of rotation of both shafts do not coincide as in the case described above and the instantaneous center of rotation of both shafts are always located at positions different from each other so as to make the angular velocities of rotation of both shafts identical.

In this case, the rollers 5 makes relative sliding motion about the axis of the respective tripod shafts 3 and axially of the cylindrical raceways. Therefore, the rollers 5 wear on the coupling surfaces and seizure prematurely occurs, and the life of the universal joint is primarily determined by the wear between the roller 5 and the cylindrical raceway 8.

In order to overcome this problem, there have been adopted various counter-measures in the prior art. Such counter-measures include improvements in surface roughness of the sliding surfaces, decreases in surface pressure and improvements in lubrication. However, these counter-measures do not include direct lubrication onto the sliding surface and are ineffective.

SUMMARY OF THE INVENTION

Accordingly, it is the general object of the present invention to provide a universal joint having improved durability.

It is another object of the present invention to provide a universal joint having direct lubrication onto the sliding surfaces thereof.

In keeping with the principles of the present invention, the objects are accomplished by a unique universal joint of the type including: a first shaft to which tripod shafts are secured radially from the axis thereof; three rollers formed on the outer peripheries thereof with spherical surfaces and with which the tripod shafts are crowned; and a second shaft provided therein with raceways identical in number with the number of rollers and on which the outer peripheries of the rollers roll and are supported. The universla joint further includes a plurality of oil grooves provided at contact-roll surfaces between the rollers and the cylindrical raceways.

BRIEF DESCRIPTION OF THE DRAWINGS

The above mentioned features and objects of the present invention will become apparent by reference to the following description taken in conjunction with the accompanying drawings wherein like referenced numerals indicate like elements, and in which.

DETAILED DESCRIPTION OF THE INVENTION

Figure 1:
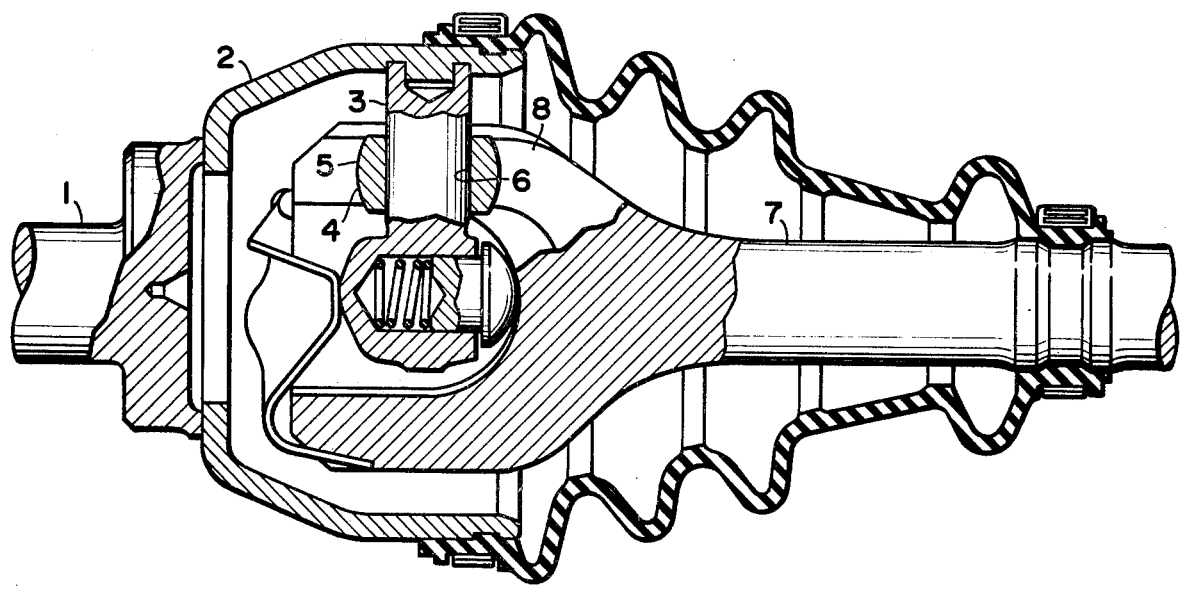
FIGS. 1 and 2 are cross-sectional views illustrating conventional universal joints.
Figure 2:
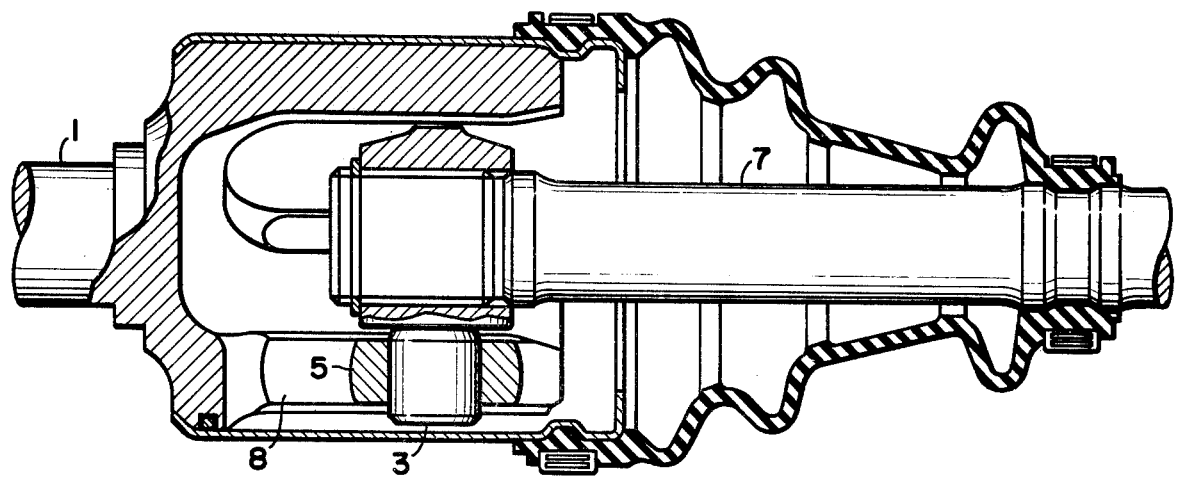
Figure 3:
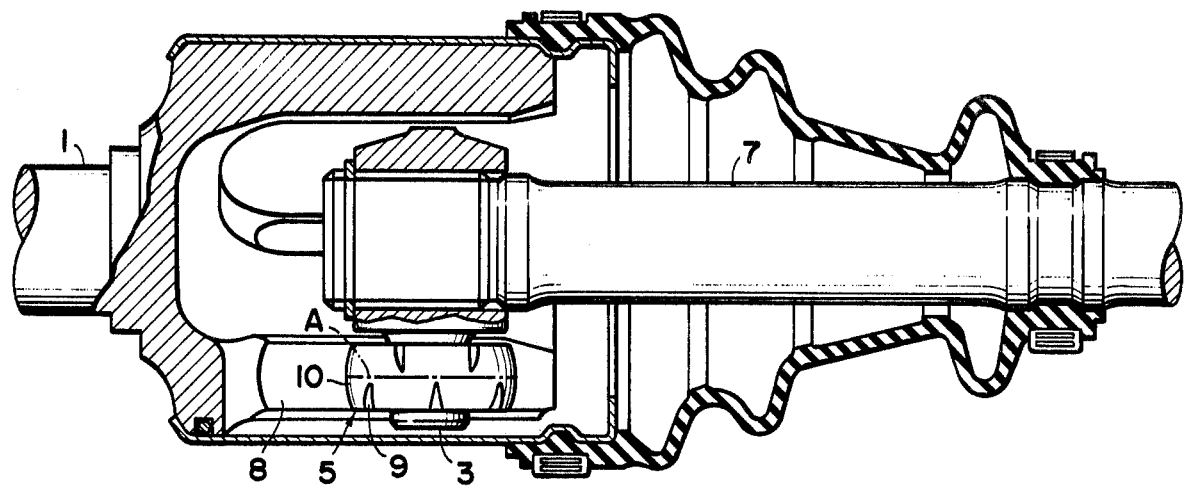
FIG. 3 is a universal joint in accordance with the teachings of the present invention.

Referring more particularly to the drawings, shown in FIG. 3 is a universal joint in accordance with the teachings of the present invention. In FIG. 3, the universal joint includes a first shaft 1 provided with cylindrical raceways 8, rollers 5, tripod shafts 3 and a second shaft 7 all formed as in the conventional universal joint of FIG. 1 except for the rollers 5.

The rollers 5 are each provided thereon with a plurality of oil grooves 9. The oil grooves 9 extend alternately of one another from the upper and lower ends of the roller 5 to the center A of the contact-roll surface 10 axially of the roller 5. The oil grooves 9 decrease in cross-section towards the center A, namely, the oil grooves 9 gradually decrease in width and/or depth towards the center A.

Accordingly, in operation, lubricating oils supplied to the axially upper and lower ends of the rollers 5 are led to the center A of the contact-roll surfaces 10 by capillary action of the oil grooves 9, and are applied uniformly on the contact-roll surface 10 by that alternately arranged oil grooves 9, so that the portions where the heaviest friction occurs can be satisfactorily lubricated.

In this embodiment, the oil grooves 9 are formed in the contact-roll surfaces of the rollers 5. However, it is sufficient to form the oil grooves 9 at the contact surfaces between the rollers 5 and the cylindrical raceways 8. Accordingly, as shown in FIGS. 4 through 7 the oil grooves may be formed in the side of the cylindrical raceways 8. However, it is easier to form the oil grooves on the rollers 5 than on the cylindrical raceways 8.

Figure 4:
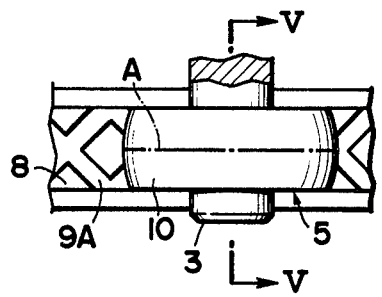
FIG. 4 is a cross-sectional view illustrating essential portions of a second embodiment of the universal joint in accordance with the teachings of the present invention.
Figure 5:
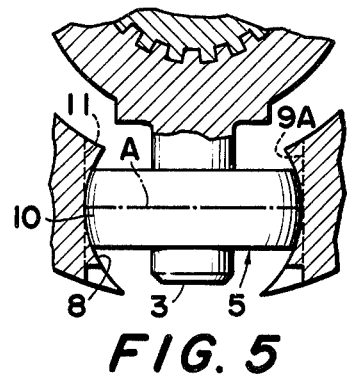
FIG. 5 is a cross-sectional view taken along the lines V—V in FIG. 4.

In FIGS. 4 and 5, lattice-like oil grooves 9A, which inclines with respect to an axis of the respective tripod shaft 3, are formed in the cylindrical raceways 8. The bottom surfaces 11 of the oil grooves 9A form planes parallel with the axis of the roller 5 and in tangential contact with the spherical contact-roll surfaces 10 of the roller 5, the oil grooves 9A gradually decrease in depth towards the center A.

Consequently, in order to form the oil grooves 9A, cuts must be made in oblique directions from the upper and lower end faces of the cylindrical raceways 8 in a plane parallel with the axis of the respective roller 5.

Figure 6:
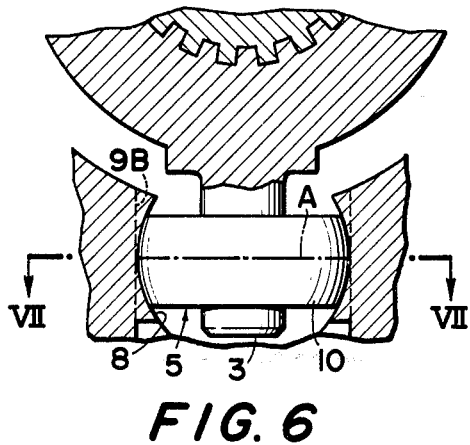
FIG. 6 is a cross-sectional view illustrating the essential portions of a third embodiment of the universal joint in accordance with the teachings of the present invention.
Figure 7:
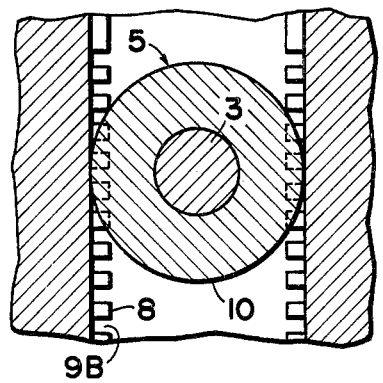
FIG. 7 is a cross-sectional view taken along the lines VII—VII in FIG. 6.

In FIGS. 6 and 7, oil grooves 9B parallel to the axis of the roller 5 are formed in the cylindrical raceways 8, in a manner that said oil grooves 9B may each extend between opposite ends of the raceways 8 or said oil grooves 9B may each extend from the opposite ends to the center A of the raceway and alternately of one another. The bottom surfaces of the oil grooves 9B also form planes in tangential contact with the spherical contact-roll surfaces 10 of the rollers 5 and, the oil grooves 9B gradually decrease in depth towards the center A. In order to form the oil grooves 9B, cuts msut be made in parallel with the axis of the roller 5.

In the embodiment shown in FIGS. 4 through 7, the closer the oil grooves 9A and 9B are to the centers A of the contact-roll surfaces, the smaller the cross-section of the oil grooves 9A and 9B become. Therefore lubricating is led to the center A by capillary action and also lubricating oil is supplied to the center A, which is the greatest diameter portion of the roller 5, by centrifugal force during operation of the motor vehicle so that satisfactory lubrication is effected.

As is apparent from the above description, the construction of the present invention results in lubricating oil being satisfactorily supplied to those portions of the rollers where the heaviest friction takes place by capillary action. Additionally, such advantages are achieved in that wear on the sliding surfaces is reduced and durability is increased, the coefficient of friction and frictional torque on the sliding surfaces is reduced, the efficiency of the joint is improved and vibrations generated by the universal joint are lowered.

It should be apparent to one skilled in the art that the above described embodiments are merely illustrative of but a few of the many possible specific embodiments which represent the applications of the principles of the present invention. Numerous and varied other arrangements can be readily devised by those skilled in the art without departing from the spirit and scope of the invention.

We claim:

1. A universal joint of the type including a first shaft to which tripod shafts are secured radially from the axis thereof, three rollers formed at the outer peripheries thereof with spherical surfaces and with which the tripod shafts are crowned and a second shaft provided therein with cylindrical raceways identical in number with the number of rollers and on which the outer peripheries of the rollers roll and are supported, said universal joint being characterized by a plurality of oil grooves provided at contact-roll surfaces between said rollers and said cylindrical raceways.

2. A universal joint according to claim 1 wherein said oil gooves gradually decrease in cross-section towards the center of said contact-roll surfaces.

3. A universal joint according to claim 2 wherein said oil grooves gradually decrease in width towards the center of said contact-roll surfaces.

4. A universal joint according to claim 2 wherein said oil grooves gradually decrease in depth towards the center of said contact-roll surfaces.

5. A universal joint according to claim 1 wherein said oil grooves are provided in a direction of a axis of said tripod shafts.

6. A universal joint according to claim 1 wherein said oil grooves are provided in the shape of a lattice being inclined with respect to the axis of the respective tripod shafts.

7. A universal joint according to claim 1 wherein said oil grooves are extendingly provided in the contact-roll surfaces from the opposite ends to the center A and alternately of one another 8. A universal joint according to claim 1 wherein said oil grooves are provided in said rollers.

9. A universal joint according to claim 1 wherein said oil grooves are provided in said cylindrical raceways.

* * * * *